Figure 1:
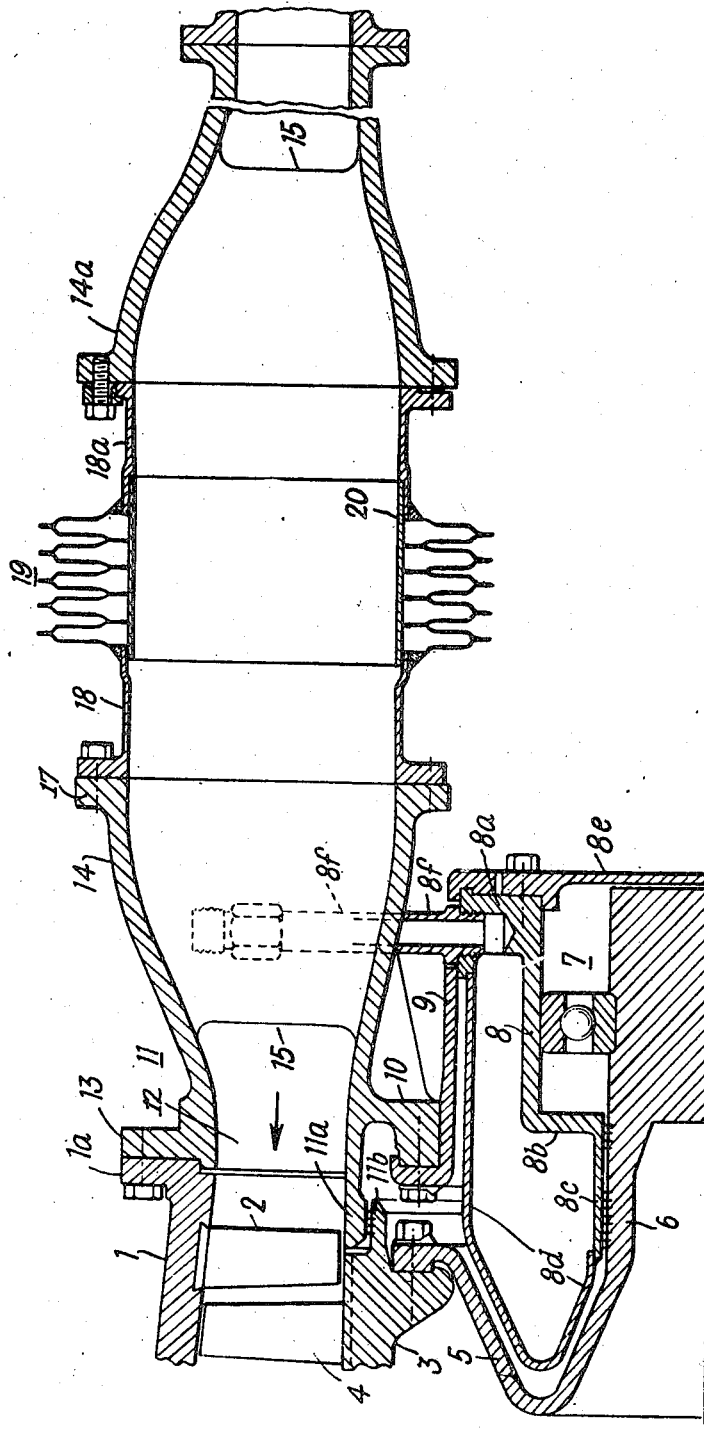

Dec. 30, 1947.　　　　K. BAUMANN　　　　2,433,416
GAS CONDUIT ARRANGEMENT FOR INTERNAL-COMBUSTION TURBINE PLANTS
Filed Jan. 13, 1944　　　3 Sheets-Sheet 1

INVENTOR
Karl Baumann
BY Loyd Hall Sutton
ATTORNEY

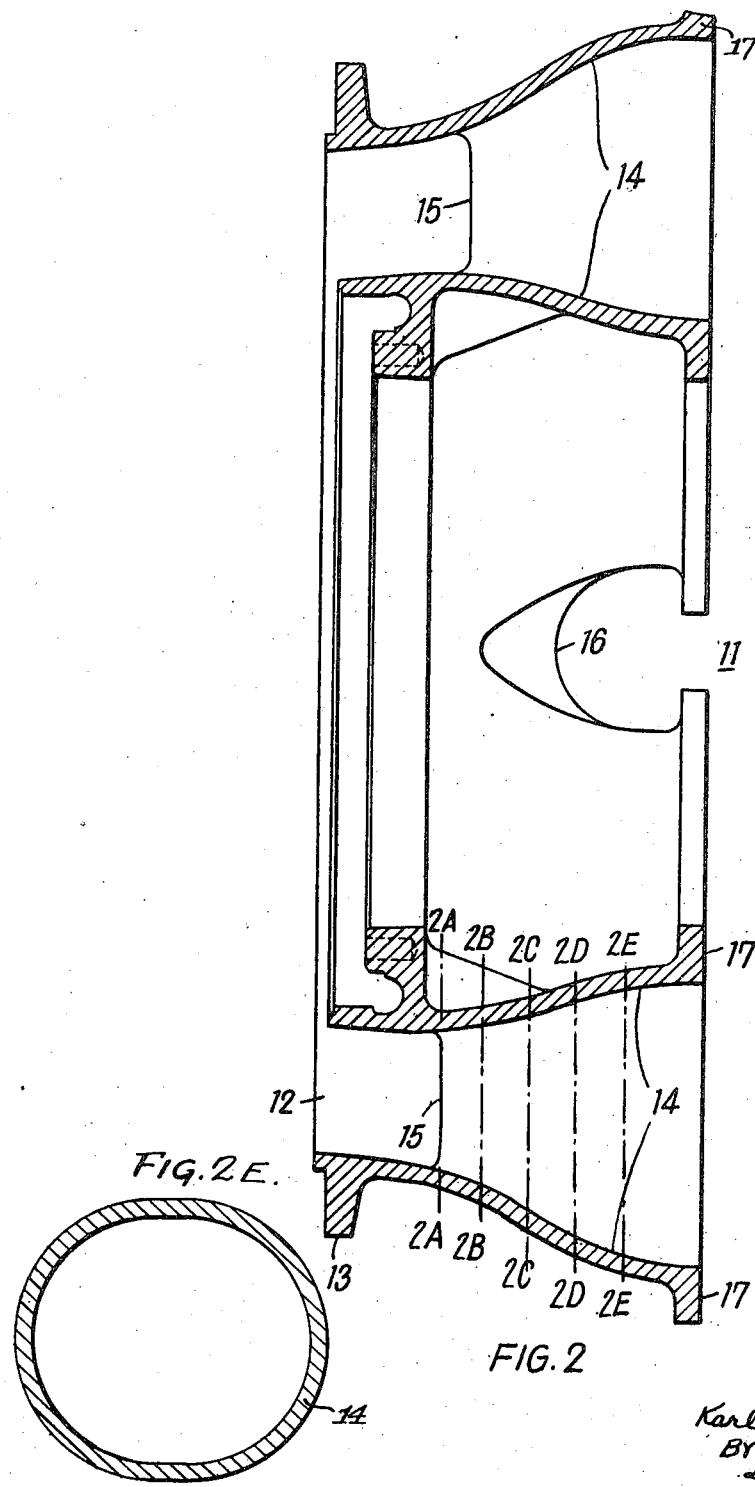

Dec. 30, 1947. K. BAUMANN 2,433,416
GAS CONDUIT ARRANGEMENT FOR INTERNAL-COMBUSTION TURBINE PLANTS
Filed Jan. 13, 1944 3 Sheets-Sheet 3

Patented Dec. 30, 1947

2,433,416

UNITED STATES PATENT OFFICE 2,433,416

GAS CONDUIT ARRANGEMENT FOR INTERNAL-COMBUSTION TURBINE PLANTS

Karl Baumann, Mere, Knutsford, England, assignor to Metropolitan-Vickers Electrical Company Limited, London, England, a company of Great Britain Application January 13, 1944, Serial No. 518,162
In Great Britain May 7, 1941

Section 1, Public Law 690, August 8, 1946
Patent expires May 7, 1961

3 Claims. (Cl. 285—2)

This invention relates to internal combustion turbine plant, axial flow compressors and like plant. Such plant may operate at high speeds, and in parts at relatively high temperatures involving considerable temperature drops between different parts of the plant, in particular between the turbine rotor drums and their bearings, which may be of the ball race type, and there are considerable forces to be taken care of including especially end thrusts. In general the design and construction of a high power, efficient internal combustion turbine power plant has presented such problems that only a very few have so far come into use. When it is a desideratum that such plant shall have a high power/weight ratio and/or occupy a small space, and if used on aircraft present a minimum head resistance, the difficulties involved in the design and construction of the plant are very greatly increased.

The present invention, inter alia, has relation on the one hand to the convenient and efficient withdrawal of axially moving fluid from a conduit, the transverse cross-section of which is of annular form, and on the other hand to the supply of fluid, particularly oil, and sealing and cooling air and water to or into the neighbourhood of the rotor bearings of the plant.

The present invention provides particularly advantageous motive fluid conduit arrangements connecting units of the plant, notably high pressure and low pressure gas turbines, the arrangement facilitating the provision of inlet and outlet pipes for said supply of oil, air and water, and also facilitating the otherwise very difficult general assembly of the plant, more especially in relation to mechanical and thermal considerations. For example, it will be appreciated that the motive fluids, compressed air and internal combustion products desirably travel longitudinally in passages of annular form in a plant having coaxial units such as coaxial turbines or coaxial compressor and combustion chamber. According to the invention, however, the annular gas outlet of one unit is connected to the annular gas inlet of the adjacent or next unit by a conduit arrangement comprising a plurality of circularly distributed pipes which are independent of each other except at their ends which are connected to annular manifolds formed with laterally flaring passages leading away from the units to said pipes. These separately formed connecting pipes may advantageously incorporate flexible expansion joints, particularly where the connected units are coaxially arranged. It will also be appreciated that such splitting-up, so to speak, of the annular gas connecting conduit into a plurality of pipes provides openings between pipes which greatly facilitates the provision of radially disposed tubes for the supply of fluid such as oil and air and water to the bearings of the rotating members of the units.

Although the invention is particularly convenient where the units of the plant are in coaxial alignment the invention is not limited in this respect, since it may be used with advantage in other arrangements of the plant units such as when they are some distance apart from each other and not coaxial, because by the arrangement of the invention the gas may be withdrawn from one unit and conveyed and caused to enter another unit at less pressure drop than with the use of the better known volute type discharge and entry members. Thus the several pipes may be bent in accordance with requirements and if there is a large separation between the units which they connect several pipes connected to one unit may, for example, merge into a large one having a somewhat similar entry system for obtaining the desired streamline flow, such large pipe being divided at its other end by a similar arrangement so as to distribute the flow into a series of inlet pipe members suitable for entrance of the gas to the annular entry member of the other unit of the plant.

In the accompanying drawings:

Fig. 1 is a sectional side elevation of the upper half of part of a plant embodying a multi-pipe arrangement according to the invention;

Fig. 2 is a sectional side elevation of one of the manifolds used in the conduit arrangement illustrated in Fig. 1, and Figs. 2A, 2B, 2C, 2D and 2E are fragmentary sections on the lines 2A—2A, 2B—2B, 2C—2C, 2D—2D and 2E—2E, respectively, Fig. 2, and as viewed from the left-hand side of that figure, indicating the change in shape of the peripherally continuous annular passage into six tubular ports of circular section distributed around the axis of the machine.

Referring more particularly to Fig. 1 of the accompanying drawings, at 1 is shown a small part of the stator of a machine which may be, for example, a low pressure gas turbine. The stator drum 1 carries a plurality of rows or stages of guide blading, one blade in the first row of blading being indicated at 2. At 3 is shown a portion of the co-operating rotor drum, namely the gas inlet end thereof, and at 4 is shown one of the blades of the first row carried by the rotor 3. The right-hand end of the rotor drum 3 is bolted to a "swan-neck" member 5 which terminates in a stub shaft 6 rotating in a ball bearing 7, the outer race of which is mounted in a stationary sleeve 8 having at the right-hand end an external flange 8a connected with the right-hand end of a resilient outer sleeve 9 which is bolted to an internal flange 10 formed on the manifold casting 11, shown separately in Fig. 2 and Figs. 2A to 2E of the drawings, in which latter figures, however, the flange 10 is not shown; and although in the arrangement shown in Fig. 1 the flange 10 is chosen as a convenient means of carrying the bearing 7 and shaft 6 through the intermediary of the members 9 and 8, the invention is not limited in this respect.

The sleeve 8 has an integral internal flange 8b integral with a secondary sleeve 8c of smaller diameter welded to a "swan-neck" member 8d which at its right-hand and outer end is secured to the flange 8a. The sleeve 8 and its portion 8b, together with the portion of the shaft surrounded by the portion 8, constitute a bearing housing which is closed by the disc 8e, and which may have supplied to it air and oil in any suitable manner, whilst the annular chamber bounded by the sleeve portions 8, 8b, 8c and the "swan-neck" member 8d is adapted to have a cooling liquid circulated through it. In this respect a water or oil outlet pipe is shown at 8f which extends radially outwards between the flaring portions of the manifold 11.

The manifold 11 at its left-hand end (Figs. 1 and 2) has the continuously annular outlet orifice 12 (Figs. 1 and 2) which is bolted by its flange 13 to a flange 1a on the stator drum 1. In Fig. 1 only the left-hand end of the manifold 11 is shown as having a cylindrical flange 11a extending close to the right-hand end of the rotor drum 3, whilst labyrinth packing 11b is provided as a gas seal between the flange 11a and the rotor drum 3.

Figure 2D:
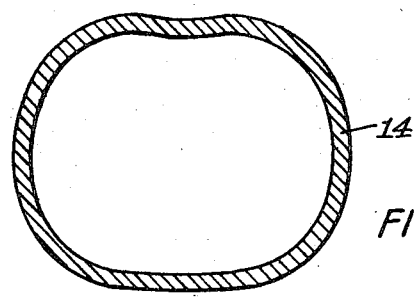

Referring now more especially to Figs. 2 to 2E inclusive, it will be seen from these figures how the continuous annular portion 12 of the manifold 11 merges into six streamlined tubular portions or ports 14, two of which are shown in section. These tubular portions are initiated by the radial webs or partitions 15, as clearly indicated in Figs. 2 and 2A, which latter figure clearly shows also the cross-sectional shape of the early portion of the streamlining of the tubular portions 14, the sectional shape changing progressively as shown in Figs. 2B to 2E.

Figure 2C:
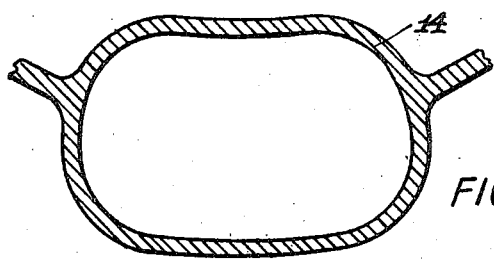
Figure 2B:
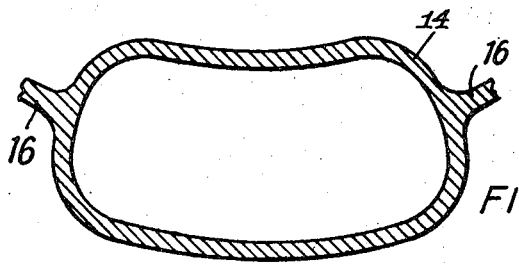
Figure 2A:
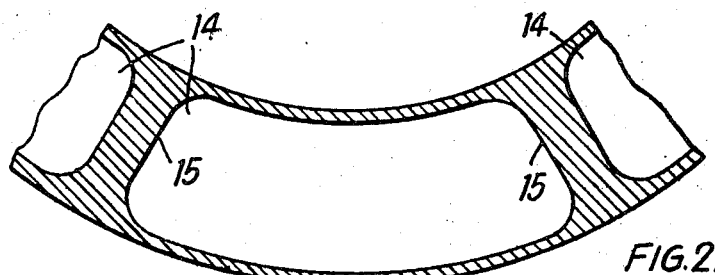

In Figs. 2, 2B and 2C are shown small webs 16, or portions thereof, uniting the tubular portions or ports 14 where they become separate from the main annular portion.

As shown in Figs. 1 and 2 the free end of each tubular portion 14 is provided with an external flange 17, to each of which flanges is bolted, as clearly shown in Fig. 1, the flange of the pipe 18, 18a, which may be continuous but which, as shown in Fig. 1, may incorporate the flexible expansion member 19. This may assume the form of a built-up accordion member having within it the tubular liner 20, the latter being telescopic within one or both of the pipes 18 and 18a and the ends of the expansion member being connected to the ends of the pipes 18 and 18a. The pipe portion 18a is bolted to the flange of a streamlined tubular portion of the manifold 11 connected to the annular discharge passage of the other unit of the plant, which may be a high pressure gas turbine and is not shown. This manifold may be generally similar to the left-hand manifold 11 and as shown in Figs. 2 to 2E.

Although the ends of the pipes 18, 18a have been connected to the gas inlet and outlet of the adjacent units through the manifold castings 11, it will be appreciated, and it is within the scope of the invention, that each pipe 18, 18a may terminate integrally at one or each end in a member which, in assembled association with similar members of the other circularly distributed pipes, may be stacked together to provide the equivalent of the manifold 11, although it is considered that in most applications the use of such manifold castings will be the more convenient to construct, assemble and use.

I claim:
1. A gas conduit arrangement for use in an internal combustion turbine plant or the like to connect an annular gas passage of one unit of said plant to another unit which comprises an annular manifold embodying an annular passage portion corresponding to the annular gas passage of said first-mentioned unit and a plurality of independent tubular portions the passages of which are flared laterally toward and merge in a streamline manner with said annular passage portion.

2. A gas conduit arrangement as claimed in claim 1, including an additional manifold for connection to the other of said units, and a plurality of circularly distributed pipes connecting said tubular portions of said manifolds.

3. A gas conduit arrangement as claimed in claim 1, including an additional manifold for connection to the other of said units, and a plurality of circularly distributed pipes connecting said tubular portions of said manifolds and having interposed flexible expansion joints.

KARL BAUMANN.

REFERENCES CITED

The following references are of record in the file of this patent:

UNITED STATES PATENTS

| Number | Name | Date |
| --- | --- | --- |
| 883,892 | Kieser | Apr. 7, 1908 |
| 1,286,204 | Baumann | Dec. 8, 1918 |
| 2,078,956 | Lysholm | May 4, 1937 |
| 2,125,703 | Williams | Aug. 2, 1938 |
| 2,178,297 | Birkigt | Oct. 31, 1939 |
| 2,247,393 | Markey | July 1, 1941 |
| 2,260,704 | Davies | Oct. 28, 1941 |

FOREIGN PATENTS

| Number | Country | Date |
| --- | --- | --- |
| 347,206 | Great Britain | Apr. 16, 1931 |
| 365,679 | Great Britain | Jan. 28, 1932 |
| 456,980 | Great Britain | Nov. 16, 1936 |